Oct. 10, 1950
K. P. PUCHLOWSKI
2,525,500
ELECTRONIC CONVERTER SYSTEM FOR DIRECT CURRENT MOTORS
Filed July 3, 1948
4 Sheets-Sheet 2
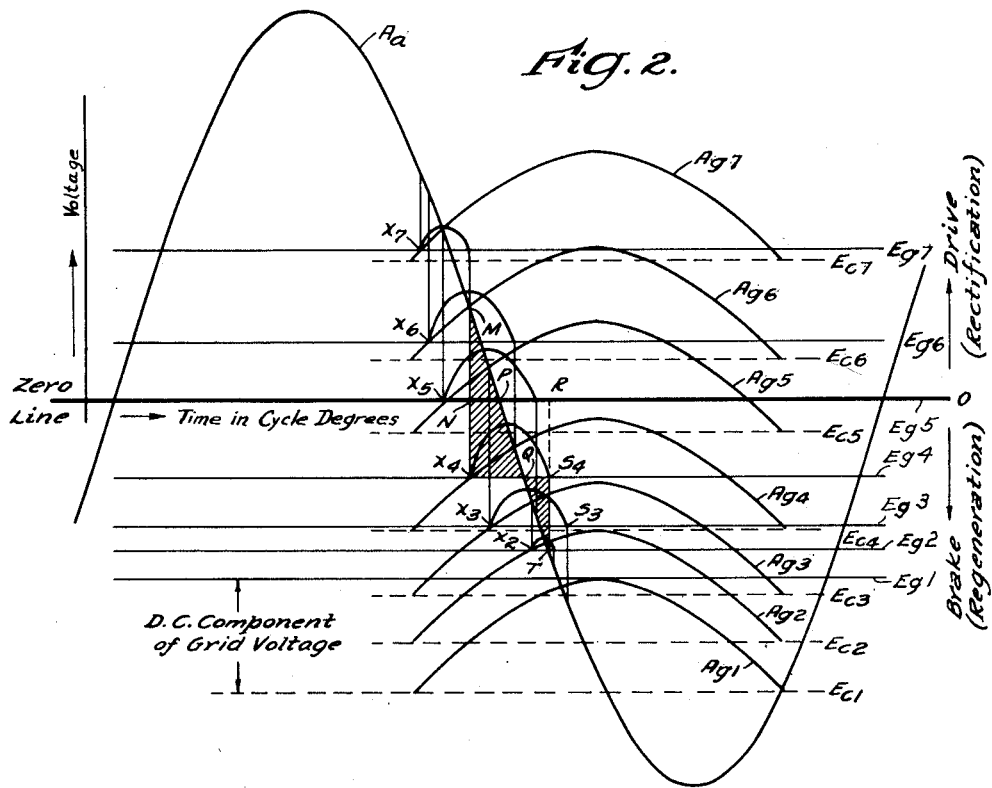
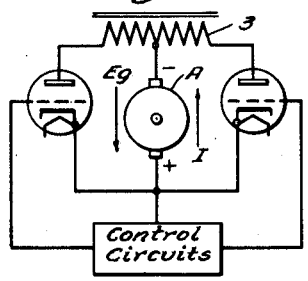
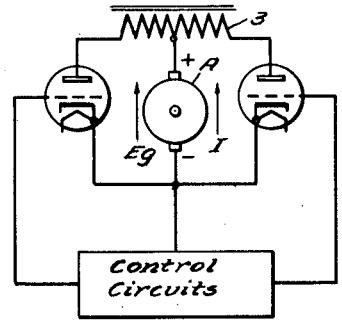
WITNESSES:
Robert C. Baird
New. C. Groove
INVENTOR
Konstanty P. Puchlowski.
BY
C. M. Avery
ATTORNEY Oct. 10, 1950 K. P. PUCHLOWSKI 2,525,500
ELECTRONIC CONVERTER SYSTEM
FOR DIRECT CURRENT MOTORS
Filed July 3, 1948 4 Sheets-Sheet 3

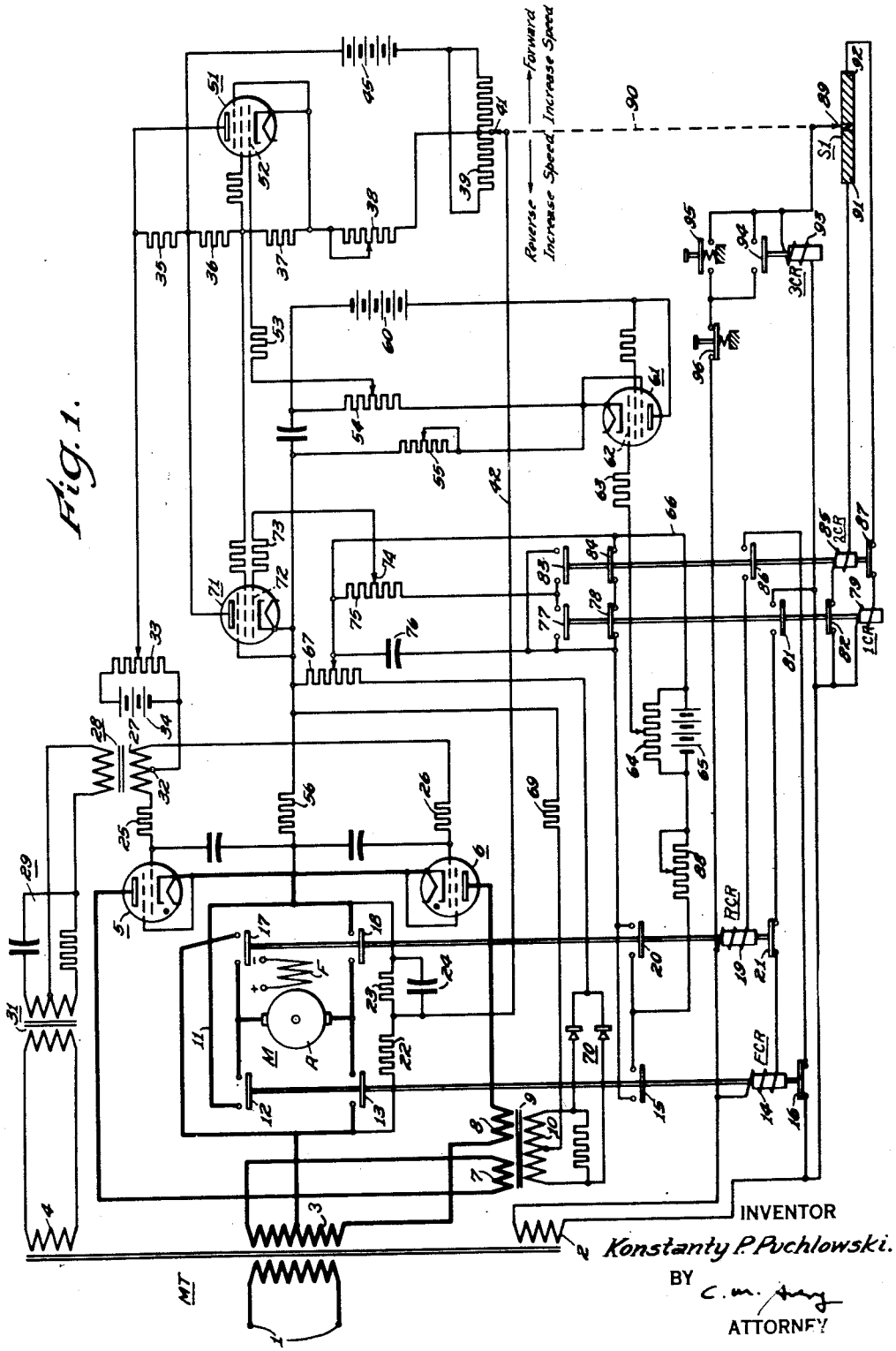

WITNESSES:
Robert C Baird
Nev. Le Groome

INVENTOR
Konstanty P. Puchlowski.
BY
C. M. ——
ATTORNEY

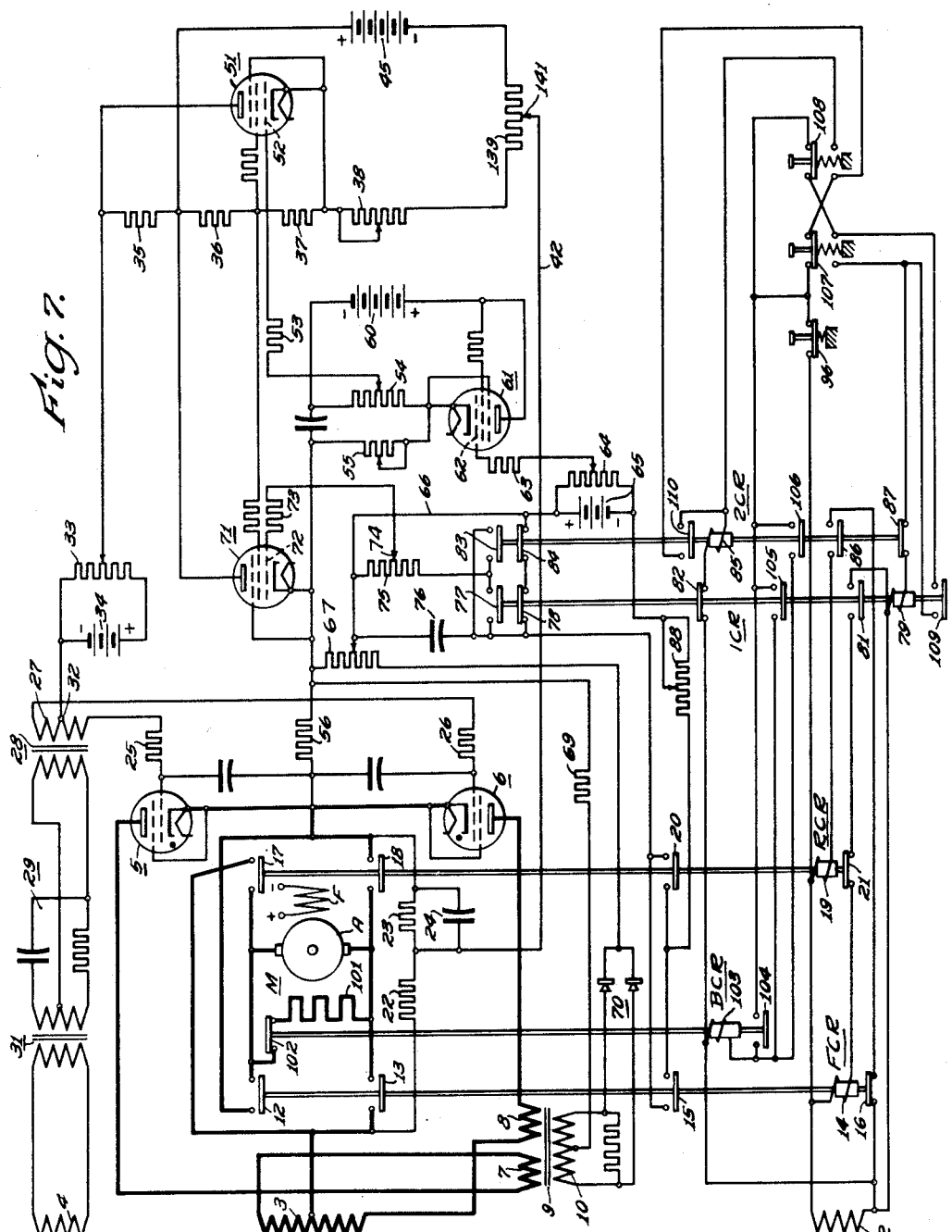

Patented Oct. 10, 1950

2,525,500

UNITED STATES PATENT OFFICE 2,525,500

ELECTRONIC CONVERTER SYSTEM FOR DIRECT-CURRENT MOTORS

Konstanty P. Puchlowski, Buffalo, N. Y., assignor to Westinghouse Electric Corporation, East Pittsburgh, Pa., a corporation of Pennsylvania Application July 3, 1948, Serial No. 36,998

7 Claims. (Cl. 318—259)

1

My invention relates to electronic control means and methods for operating direct-current motors from an alternating-current source.

In the customary systems of this type the current from the alternating-current source flows to the motor through controllable arc-discharge devices which operate as rectifiers. Since the current flow through the discharge device cannot change its direction, such systems cannot provide regenerative braking of the motor. That is, such systems normally cannot feed energy, generated in the motor armature during braking conditions, back into the power supply circuit. Therefore, customary electronic rectifier systems are not very suitable for controlling overhauling loads as occurring, for instance, in hoist control systems or traction drives.

It is an object of my invention to provide an electronic control system for operating direct-current motors from an alternating current source, that operates regeneratively, i. e. in an inverting sense, during overhauling load or braking conditions of the motor thus causing regenerative braking of the motor.

Another object of the invention is to devise an electronic control system that permits operating the motor at controllable speed in the running direction and at the same time provides regenerative braking whenever the system is set for reversing the motor running direction, thus securing a rapid reversal under continuous maintenance of a speed-controlling forcing action and under avoidance of uncontrolled coasting periods or dynamic-braking periods during the reversing performance.

It is also an object of the invention to provide a regeneratively operative control system as set forth above that, during regenerative or reversing periods of the motor, prevents the motor current from exceeding a safe limit value of the electronic discharge device.

Another object of my invention is the provision of an electronic motor control system that permits imposing on the motor a regenerative braking of an adjustable degree as may be necessary or desired for counteracting or braking an overhauling load by counter torque, and nevertheless preventing the motor from undesired acceleration in the other direction.

An object, related to the foregoing, is also to devise an electronic system of the kind mentioned that is especially suitable for operation as a hoist drive and permits counter-torque braking of overhauling hoist loads.

Another object, also related to those mentioned, is the provision of a drive for machine tools or other fabricating machinery capable of performing rapid and frequent reversing strokes of adjustable length and speed as required, for instance, for the reciprocating table of a planer.

These and other objects of the invention, as well as the methods and means provided by the invention for achieving these objects, will be apparent from the following description in conjunction with the drawings, in which:

Figure 1 is a circuit diagram of a reversible control system applicable for hoist and traction drives or, generally, for drives subject to overhauling loads;

Figs. 2, 3 and 4 are explanatory diagrams relating to the operation of the systems shown in Figs. 1 and 7;

Fig. 7 is the circuit diagram of another embodiment designed for rapidly reversing drives under push-button or limit switch control, for instance, for machine tools.

Figure 5:
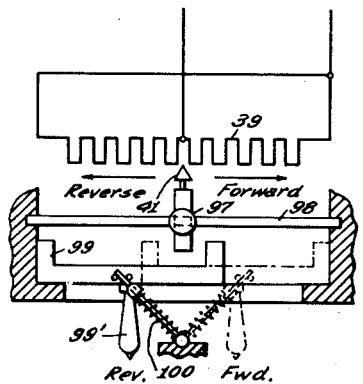
Figs. 5 and 6 show respective modifications of details in the system of Fig. 1.

The alternating-current terminals 1 of the system shown in Figure 1 are connected to a main transformer MT with secondary windings 2, 3 and 4. Two thyratrons 5 and 6 have their respective anodes connected to the ends of secondary winding 3 through the primaries 7 and 8, respectively, of a transformer 9 with a mid-tapped secondary winding 10. The thyratrons 5 and 6 have a common cathode lead 11 connected through the armature A of the motor M to the mid-point of transformer winding 3 under control by contactors FCR and RCR. The main contacts 12 and 13 of contactor FCR are controlled by a coil 14 which also actuates two auxiliary contacts 15, 16. The main contacts 17 and 18 of contactor RCR are controlled by a coil 19 which also actuates two contacts 20 and 21. The motor field winding F is energized from a separate direct-current source of substantially constant voltage, for instance, a rectifier energized from another secondary winding (not shown) of transformer 2. Two resistors 22 and 23 are connected in series with each other across the armature A. A filtering capacitor 24 is connected across resistor 23.

The respective control circuits of thyratrons 5 and 6 extend from the control grids through respective resistors 25 and 26 to the ends of the secondary winding 27 in a transformer 28. Transformer 28 is energized, through a phase shift circuit 29 and an appertaining phase shift transformer 31, from the secondary 4 of transformer 2 and impresses on the thyratron control circuits an alternating component voltage whose phase is displaced to lag the anode voltage of the respective thyratron. While it is customary to make the component alternating grid voltage lag 90° behind the anode voltage, it is essential for the invention that the phase shift elements 29 and 31 are designed to provide a phase lag of about 120°.

From the tap point 32 of secondary 27, the two thyratron control circuits extend in common through a portion of a rheostat 33 which is impressed by constant voltage from a suitable direct-current source schematically represented at 34. From the tap of rheostat 33, the common portion of the thyratron control circuits extends through resistors 35, 36, 37, 38 to the center tap 41 of the speed-control rheostat 39 whose slider 41 is connected through a lead 42 and through resistor 23 to the cathode lead 11 of the thyratrons.

The tapped-off portion of rheostat 33 imposes on the grids of thyratrons 5 and 6 a negative direct voltage of an adjusted magnitude which remains constant during the operation of the system. A suitable direct-current source of constant voltage, represented at 45, is connected across resistors 36, 37, rheostat 38 and potentiometer rheostat 39, so that a substantially constant voltage is impressed from the source 45 across resistors 36, 37, 38 and the rheostat 39. The algebraic sum of the voltages across the active portion of rheostat 33 and across resistors 36, 37 and 38 is substantially constant during the operation of the system and represents a constant positive direct-voltage grid bias for thyratrons 5 and 6 which is superimposed on the constant alternating voltage provided by the grid transformer 28.

A third component grid voltage is impressed on the thyratron control circuits by the resistor 35. This resistor is series connected in the plate circuit of a master control tube 51 which is an amplifying high-vacuum tube, for instance, a pentode. Plate voltage for tube 51 is supplied from source 45 and taken from across the resistors 36 and 37. The direct-voltage drop across resistor 35 forms the negative variable component of the thyratron grid voltage. This component varies with the conductivity of tube 51 and determines the firing angle of the thyratrons. Therefore, the magnitude of the rectified voltage applied to the motor armature A depends upon the voltage condition of the control grid circuit of tube 51.

The control grid circuit of tube 51 extends from grid 52 through a resistor 53, a potentiometer rheostat 54, a rheostat 55 and a resistor 56 to the thyratron cathode lead 11, thence through the resistor 23 and lead 42 to the slider 41 of a potentiometer rheostat 39. From rheostat 39, the grid circuit extends through rheostat 38 to the cathode of master control tube 51.

The just-mentioned grid circuit for tube 51 includes two main sources of grid voltage. One source consists in the adjustable portion of potentiometer 39 (speed control rheostat). The direct voltage supplied from potentiometer 39 between its center tap and the slider, when the latter is moved in either direction from the center tap, tends to make the control grid 52 of tube 51 negative, with respect to the tube cathode. The adjustable voltage obtained from potentiometer 39 represents the reference voltage of the system, and its magnitude determines the speed at which the motor M is supposed to run. The second main grid voltage is obtained across resistor 23. The voltage across resistor 23 is proportional to the armature terminal voltage and consequently approximately proportional to the motor speed. The direct voltage across resistor 23 is opposed to the speed control voltage from rheostat 39, i. e., tends to make the control grid 52 of tube 51 positive with respect to the cathode.

In addition, the above-mentioned grid circuit for master tube 51 includes an adjustable portion of the potentiometer rheostat 54. This rheostat serves to impress on the control grid of the master control tube 51 a corrective negative grid voltage in proportion to the armature current, in order to compensate for speed variations due to changes in IR drop of the armature circuit. Potentiometer rheostat 54 is connected in series with an amplifying vacuum tube 61 such as a pentode, across a suitable direct-current source of constant voltage, schematically shown at 60. Consequently, the magnitude of the corrective negative grid voltage component applied to the grid of tube 51 depends upon the conductance of tube 61 which, in turn, is determined by the voltage impressed on the grid circuit of tube 61.

The grid circuit for tube 61 extends from the control grid 62 through a resistor 63, and through an adjusted portion of a potentiometer rheostat 64 which is impressed by constant voltage from a suitable source of direct current shown at 65. Thence, the grid circuit extends through a lead 66, an adjusted portion of a potentiometer rheostat 67 and the rheostat 55 to the cathode of tube 61. A constant negative grid bias is imposed on the grid circuit across the adjusted portion of rheostat 64. This negative bias opposes a variable positive grid voltage component which appears across the active portion of potentiometer rheostat 67 and is proportional to the load current in the armature circuit of the motor. This proportionality is secured in the following manner. A rectifier circuit 70 is connected to the secondary 10 of the transformer 9. Since the primary of transformer 9 is energized by the armature load current, the secondary voltage and the output voltage of rectifier 70 are proportional to the load current. The rectified output voltage is applied across the potentiometer rheostat 67 through a resistor 69.

A third amplifying vacuum tube 71 is provided to limit the armature current of the motor especially during accelerating periods. The tube 71 is a pentode characterized by a sharp cut off and has a power supply in common with the master control tube 51. That is, the plate circuit of tube 71 is energized from source 45 and extends through rheostat 39, lead 42, resistor 23, cathode lead 11, and resistor 56 to the cathode of tube 71.

The grid circuit of tube 71 extends from the control grid 72 through a resistor 73 to the slider 74 of a potentiometric rheostat 75, through a portion of potentiometer 75 and through a portion of potentiometer 67 to the cathode of tube 71. Consequently, the voltage across the active portion of potentiometer 67 which, as explained, is a measure of the armature current, is also effective in the grid circuit of the current limiting tube 71, and forms a positive variable component of the grid voltage. Another grid voltage component for tube 71 appears across the active portion of potentiometer 75. This voltage is derived from the source 65 and modified by a capacitor 76 which when operative, lies across the potentiometer 75. The connection of potentiometer 75 to source 65 and to capacitor 76 is controlled by relays 1CR and 2CR. Relay 1CR has main contacts 77 and 78 under control by a coil 79 which also actuates two interlock contacts 81, 82. Relay 2CR has main contacts 83, 84 controlled by a coil 85 together with interlock contacts 86, 87.

Slider 41 of speed control potentiometer 39 is mechanically connected with the slider 89 of a switch device S1, this connection being schematically represented by a broken line at 90. When the slider 41 of rheostat 39 is moved from the illustrated zero-speed position, the slider 89 moves simultaneously and engages either the contact strip 91 or the strip 92, depending upon the direction of slider displacement in potentiometer 39. Slider 89 is connected with the coil 93 of a relay 3CR whose contact 94 lies across a normally open start contact 95 such as a safety pushbutton switch which is series connected with a safety stop push-button contact 96.

The operation of the system is as follows: When the slider 41 of speed control rheostat 39 is in the illustrated off position, the closing of the start contact 95 causes relay 3CR to become energized from winding 2 of transformer MT. Relay 3CR holds itself in through contact 94 when thereafter the start contact 95 is released by the operator. The system is now in operative condition until the stop contact 96 is momentarily depressed. As long as the sliders 41 and 89 remain in the off position, the motor M will not start because contact 89 of switch S1 does not make contact with either of the contact strips 91 and 92 so that the coil circuits of relays 1CR, 2CR, and FCR and RCR remain deenergized.

When the operator moves the slider 41 toward the right, contact 89 engages strip 92 and energizes coil 79 of relay 1CR. Contact 78 now opens the normally closed discharge circuit for capacitor 76; and contact 77 connects the capacitor across the rheostat 75. Shortly later, contactor FCR picks up because its coil 14 is now energized from the winding 2 of transformer MT through contact 81 of relay 1CR. Contacts 12 and 13 of contactor FCR close the armature circuit of motor M, and the motor accelerates up to the speed determined by the selected setting of the slider 41 of speed control rheostat 39. When the slider 41 is moved from the off position in the reverse direction (toward the left), relay 2CR and contactor RCR pick up instead of relay 1CR and contactor FCR, so that the motor will run in the reverse direction at a speed determined by the setting of the slider 41.

The performance of the system during accelerating and reversing periods will be more readily understood after an explanation of the speed regulation effective during normal running conditions of the motor.

When the motor is running at any selected speed, for instance, in the forward direction, and disregarding for a moment the effect of the IR-drop compensating tube 61, the voltage across the active portion of the speed control rheostat 39 (i. e., between the slider 41 and the center tap) and the opposing voltage across resistor 23 in the grid circuit of the master control tube 51 approximately balance each other to such an extent that a resultant negative voltage of a few volts is applied to the control grid of master tube 51. This resultant grid voltage corresponds to a definite amplified voltage across the resistor 35 in the plate circuit of tube 51, and thus to a definite firing angle of thyratrons 5 and 6. If the slider 41 is moved farther away from the neutral position, this balance is momentarily disturbed. The control grid of master tube 51 becomes more negative, and the voltage across resistor 35 decreases thus advancing the firing point of the thyratrons. This results in an increased armature voltage and motor speed. The increase causes a corresponding voltage increase across resistor 23 of such a magnitude that a new balance of the system is established at a slightly more negative resultant grid voltage of master tube 51. Conversely, the speed of the motor is decreased when the slider 41 is moved toward the neutral position. In summary, the running speed of the motor tends to maintain a value dependent upon the selected position of slider 41.

However, since the armature voltage of motor M, measured across resistor 23, is not an accurate indication of the motor speed but increases more than in proportion to the speed when the torque on the motor and hence the IR drop in the armature circuit increase, a corrective control of the grid circuit for master tube 51 is necessary to have the setting of slider 41 accurately to determine the actual motor speed regardless of variations in motor load.

This correction is provided by the variable voltage drop which occurs across the portion of rheostat 54 included in the grid circuit of master tube 51. As mentioned, the voltage impressed across rheostat 54 is controlled by the tube 61 whose grid circuit includes the rheostat 64, acting as a source of a constant negative grid voltage, and the rheostat 67, acting as a source of positive voltage which varies in proportion to the IR drop in the armature circuit. When the IR drop increases, for instance due to an increase in motor load, tube 61 becomes increasingly conductive and applies to the rheostat 54 an increasing amplified voltage which, in the grid circuit of master tube 51, is cumulative to the voltage from rheostat 39. In this manner, the resultant grid voltage of master tube 51 is corrected to compensate for variations in motor speed due to changes in IR drop.

It will be understood from the foregoing, that the motor M will run in the forward or reverse direction depending on the direction of the simultaneous displacement of sliders 41 and 89 from the neutral position, and the speed is determined by the selected position of slider 41 of the speed control rheostat 39. The system will regulate this speed to maintain it constant, regardless of motor load variations within the rated current range.

Turning now to the performance of the system during starting and accelerating periods, it should be remembered that the resistor 56 is connected in the plate circuit of the accelerating tube 71 and lies also in the grid circuit of the master tube 51. Consequently, another voltage, of a positive polarity, originating from the plate current of tube 71 and controlled by the voltage conditions in the grid circuit of tube 71, may become imposed on the grid of the master control tube 51. The grid circuit of tube 71, as described above, includes the load-current indicating rheostat 67 and the biasing rheostat 75 energized from the source 65. An examination of the plate circuit of tube 71 reveals that the action of the tube 71 is just opposite to that of the IR drop compensating tube 61. In general, an increasing armature current measured by the voltage across rheostat 67 tends to make the control grid of accelerating tube 71 less negative through the influence of the voltage drop across rheostat 67, and in that way will cause the plate current of tube 71 to increase. This results in an increase of voltage drop across resistor 56, and the control grid of the master tube 51 becomes less negative so that the plate current of tube 51 increases. Consequently, the firing angle of the thyratrons 5 and 6 is correspondingly delayed.

The grid circuit of tube 71 is so designed that within the normal operating range of armature current, say from zero to full-rated current, tube 71 is non-conductive, that is, does not conduct any current because it is biased off by a sufficiently high negative grid voltage from rheostat 75. Therefore, within that range, the armature current affects only the IR-drop compensating tube 61 as previously described. If, however, the armature current increases to a definite limit value, tube 71 starts conducting. The current limit value is adjustable by means of rheostat 75 and, in most practical cases, is kept within the range of 1.8 to 2.5 times rated armature current of the motor. The tube characteristic and the circuit constant are such that the amplifying action of tube 71 is much stronger than that of tube 61. Consequently, as soon as tube 71 starts conducting due to excessive current in the armature circuit, the action of tube 71 provides a very strong delaying effect on the firing angle of the thyratrons 5 and 6. This delay opposes the tendency of the current to increase. With still increasing load torque, the motor will stall when the current in the armature reaches its maximum value determined by the setting of slider 74 in rheostat 75.

During the starting period of the motor, beginning at the moment when, for instance, contactor FCR picks up, the current will rise and usually will attain the current limit determined by the grid conditions of the current limiting tube 71, that is, by the setting of the rheostat 75. In that way, the starting torque of the motor is also limited so that a smooth and shockless starting is obtained.

The current limiting circuit can become operative only after the average current has reached a definite value. That is, if it were not for the capacitive timing circuit explained below, tube 71 would not affect the angle of ignition at which the first breakdown of the thyratron tubes will occur immediately after the closing of the armature contactor FCR or RCR; and the first breakdown would take place at a firing angle which is not delayed by the action of tube 71 and is determined solely by the setting of rheostat 39. Under these conditions, the first pulse of armature current would attain a considerable magnitude, being limited only by the resistance and inductance of the armature winding. As a matter of fact, if the speed control rheostat 39 is set for a high speed, the first instantaneous peak of current will be usually much higher than the armature rectifier tubes would tolerate.

In the illustrated system, however, this danger is eliminated by a time delaying action which is effective during the starting periods of the motor so that in fact a fixed current-limit action is combined with a properly timed acceleration. This delaying action is produced by the circuit which includes the capacitor 76, rheostat 88, and the contacts 15, 20, 77, 78, 83 and 84. When the auxiliary relays 1CR and 2CR and the armature contactors FCR and RCR are open, the voltage across the capacitor 76, as well as across the resistor 75, is equal to zero. Therefore, the negative grid bias voltage of tube 71 is zero, and tube 71 is conducting full current resulting in a high voltage drop across resistor 56. Under these conditions, the master control tube 51 conducts full current regardless of the setting of the speed control rheostat 39, so that thyratrons 5 and 6 are not allowed to conduct.

At the closing instant of armature contactor FCR or RCR (after relay 1CR or 2CR was closed), the voltage across resistor 75 is still equal to zero and thyratrons 5 and 6 cannot conduct. However, the voltage across the current-limit resistor 75 will rise gradually following the charging of the capacitor 76 through the rheostat 88. In that way, the tube 71 is being biased off gradually, and the firing angle of the thyratrons is gradually advanced so that the magnitude of the first current pulses is limited even before tube 71 responds to the feed-back from the armature-current indicating resistor 87. The time delay provided by the capacitor 76 and rheostat 88 is of short duration, corresponding to 3–4 cycles only, and the rest of the acceleration is controlled by the tube 71 in accordance with the feed-back from resistor 87 as previously described.

The invention is characterized especially by the functioning of the system during reversing, decelerating and overhauling periods of the motor. The phenomena then occurring will be explained presently with reference to the voltage-time characteristics shown in Figure 2.

The conditions represented in Fig. 2 are typical of a regenerative or reversing performance of the motor which can be brought about, for instance, in the following manner. Let us assume that the slider 41 of speed control potentiometer 39 (Fig. 1) is set all the way toward the right and that, consequently, the motor is running at full speed in the forward direction. If the common control handle of the sliders 41 and 89 is then suddenly moved all the way to full reversing speed, coil 79 of relay 1CR becomes deenergized as soon as sliders 41 and 89 pass through the off position. Thereafter, relay 2CR picks up, contactor FCR drops out and contactor RCR picks up. The polarity of the armature connection in the thyratron load circuit is reversed so that the thyratron and armature circuit of the system is now changed from the motoring condition schematically represented in Fig. 3 to the regenerative condition shown in Fig. 4. In Fig. 4, the voltage $E_g$ generated in the motor armature A produces a current I which is fed through the inverting rectifier into the transformer MT and into the alternating-current line, while the motor is braked down to zero speed. Then the motor accelerates in the opposite direction up to the speed set by the speed control rheostat 39.

During the regenerative period, the alternating-current component and the direct-current component of the grid voltages applied to the thyratrons pass through the series of conditions schematically represented in Fig. 2.

In Fig. 2, the sine wave of the transformer voltage is denoted by graph $A_a$. Graphs $A_{g1}$, $A_{g2}$, $A_{g3}$, etc., represent the alternating grid voltage component on one of the thyratrons at different moments of the reversing period. The lines $E_{c1}$, $E_{c2}$, $E_{c3}$, etc., represent the direct grid voltage component of the same thyratron also at different but corresponding moments during the reversing period. The lines $E_{g1}$, $E_{g2}$, $E_{g3}$, etc., represents the corresponding direct voltages (electromotive forces) generated in motor armature.

Let us assume that the motor is running at full speed and full field in a given direction, and then the main contactors RCR and FCR are reversed so that the direct-current voltage $E_g$ generated in the motor changes its polarity with respect to the system from that indicated in Fig. 3 to that shown in Fig. 4.

Let us further assume that at the closing instant of the reverse contactor (instant 1) the direct-current component of the grid voltage is $E_{c1}$, the alternating current grid voltage is $A_{g1}$ and the motor generated voltage is $E_{g1}$ (Fig. 2).

As stated, the alternating component grid voltage of the thyratrons is dephased about 120° instead of the customary 90°. For the purpose of simplification, let us also assume that the critical grid voltage of the rectifier tube is zero, i. e., coincides with the cathode potential. The alternating component grid voltage and the direct component grid voltage are referred to the cathode potential. The cathode potential depends upon the counter EMF of the motor and hence varies in accordance with the lines $E_{g1}$, $E_{g2}$, etc. The critical grid voltage, assumed to coincide with the cathode potential, shifts accordingly and hence is also represented by the lines $E_{g1}$, $E_{g2}$, etc. for respectively different moments. Consequently, under the above-assumed conditions, the rectifier tubes will not fire at the closing instant of the reverse contactor (instant 1) so that no current flows in the armature circuit.

At a later instant 2, the voltage generated by the motor becomes $E_{g2}$, the direct current grid voltage $E_{c2}$, the alternating current grid voltage component $A_{g2}$ and the tube fires at the point $X_2$. As shown in Fig. 2, point $X_2$ corresponds to a phase angle (firing angle) of about 195°.

At following respective instants, the generated voltages will be $E_{g3}$, $E_{g4}$, $E_{g5}$, $E_{g6}$ and $E_{g7}$, the direct current grid voltages $E_{c3}$, $E_{c4}$, $E_{c5}$, $E_{c6}$ and $E_{c7}$, the alternating current grid voltages $A_{g3}$, $A_{g4}$, $A_{g5}$, $A_{g6}$ and $A_{g7}$ respectively, and the firing points $X_3$, $X_4$, $X_5$, $X_6$, and $X_7$, respectively.

For instance, at the fourth moment selected for observation, the current starts flowing at the point $X_4$ and stops flowing at the point $S_4$ (the delay of extinction being due to the inductance of the motor armature). This current causes an average voltage drop proportional to the algebraic sum of the two shaded areas $X_4MQ(+)$ and $QS_4T(-)$. This voltage drop is always positive. The average output voltage at the terminals of the transformer-rectifier system, however, is proportional to the algebraic sum of the areas $NMP (+)$ and $PRT (-)$. Here, obviously, area PRT is larger than area NMP so that the average output voltage of the inverter is negative, i. e., opposing the flow of current.

The fact that the current produced by the EMF of the motor flows in opposition to the transformer voltage means that, during the period of conduction of the rectifier tube, the power supplied by the transformer is negative, i. e., the transformer becomes a receiver of energy which is being supplied by the motor operating as a generator. Thus, a braking torque is developed in the motor and this torque is effective in reversing the motor or in opposing the torque of an overhauling load. In both cases, the mechanical energy of the system is transformed into electrical energy in the motor and is regenerated into the alternating current line through the inverting system.

At a certain definite instant, the average output voltage of the inverter becomes equal to zero and the process of regeneration stops. With proper control of the firing angle (through current limiting action) this occurs at the instant when the speed of the motor is slowed down to a value close to zero. From that point on the direction of energy transfer is again from the transformer to the motor, the system ceases to be an inverter and becomes a rectifier drive and, if the adjustment of the speed control potentiometer 39 is not changed, the motor is accelerated to its proper speed in the opposite direction.

It should be recognized that the invention not only provides for regenerative operation, but, by virtue of the above-described current-limiting tube circuits, also permits maintaining the armature current during the reversing process at a constant value. Thus, excessively high currents are avoided, and constant reversing or braking torque is developed. On the other hand, at the time when the motor speed is close to zero, the current still has its full, controlled magnitude so that the motor can be very rapidly forced through zero speed. This is a decided advantage of reversing by regenerative braking over reversing by dynamic braking.

It remains to be explained how the above-mentioned reversing phenomena are set into play when the motor, in a system according to Fig. 1, is suddenly caused to reverse by moving the slider 41 of the speed adjusting rheostat 39 from speed in one direction (for instance, in the forward direction) to a selected speed or full speed in the reverse direction. At the instant when the sliders 41 and 89 are passing through the off position (moving to the left), relay 1CR becomes de-energized because its coil circuit is interrupted by slider 89. Relay 2CR is now in condition to pick up; but due to the interlock contact 82 in relay 1CR, relay 2CR cannot pick up before relay 1CR has fully dropped to its open position. Consequently, an interval of time is available sufficient for capacitor 76 to discharge through contacts 78 and 84 of relays 1CR and 2CR. On the other hand, the voltage across rheostat 75 immediately drops to zero at the moment when contact 77 of relay 1CR starts opening. Therefore, in accordance with the foregoing considerations presented in conjunction with Fig. 2, the current conditions of the accelerating tube 71 and master control tube 51 are such that at the instant of closure of contactor RCR, they both conduct full current and no current will flow through the thyratrons 5 and 6 because their grid voltage conditions are then similar to those illustrated by graphs $E_{g1}$, $E_{c1}$ and $A_{g1}$ in Fig. 2.

At the moment when relay 2CR closes resistor 75 is connected across capacitor 76 and contactor RCR is caused to reverse the motor connections. As soon as contactor RCR closes, the capacitor 76 starts charging from source 65 at a rate determined by the selected adjustment of the rheostat 88. Consequently, the resistor 75 shows an increasing voltage until, soon this voltage reaches its final value. From this point on the conductivity of tubes 71 and 51 is controlled from the armature current feedback network (potentiometer 67), providing the current-limiting action described previously until the reversing or braking is completed.

In accordance with the operation of the above-described time-delay circuit of capacitor 76 and resistors 75, 88, and due to the current-limiting action of tube 71, the current in the armature of the motor rises rapidly to its limit value and the thyratron system passes through the intermediate conditions represented in Fig. 2 and explained above. As a result, the motor is quickly decelerated by regenerative braking; and, if the control handle is left in its reverse speed position, the motor rapidly passes through zero and is accelerated to the adjusted speed in the reverse direction. However, the operator can prevent the motor from reversing and stop it by simply turning the handle to the off position when the speed of the motor approaches zero.

Of course, a similar braking action is obtained if the handle is moved only slightly in the opposite direction past the off position, just enough to allow the reversal of main contactors RCR, FCR, to a position where the speed of motor in the reverse direction is still zero. To facilitate such an operation, a mechanical interlock or limit mechanism can be used which is movable between "forward" and "reverse" positions. In either position of the mechanism, the main speed control handle for sliders 41 and 89 is allowed to travel from its middle position all the way in one direction and only slightly in the other direction, just enough to allow the main contactors to reverse and thus provide the regenerative braking for quick stopping or for full control of speed of overhauling loads. Obviously, for proper control of the overhauling load the braking torque developed in the motor must be always higher than the overhauling torque. The actual control of the overhauling load is obtained by the operator by setting the control handle intermittently at reverse and off positions as dictated by the speed of the overhauling load. The magnitude of the braking torque, which always must be higher than the overhauling torque, is proportional to the current limit, and is adjustable within a certain range by means of slider 74 of potentiometer 75, as described previously.

A mechanism of the just-mentioned kind is schematically exemplified by Fig. 5. The slider 41 of the rheostat in a system according to Fig. 1, is mounted on a support 97 which is manually adjustable along a guide bar 98 to place the slider 41 at a selected speed point for forward or reverse operation of the motor. An abutment structure 99 is biased by a toggle spring 100 to remain either in the position shown in full lines or in the position indicated by broken lines. The structure 99 is actuated by a handle 99' which is to be set by the operator into one of the two positions. When the structure 99 is in the reverse position shown in full lines, the support 97 for the slider 41 permits moving the slider to any speed point for reverse operation, but the support 97 abuts against the structure 99 when the slider is placed on a given point for low speed in the forward direction. When the structure 99 is placed in the forward position, the support 97 can be moved over the entire range for forward speed but is permitted only a limited movement within low speed adjustments in the reverse range. Of course, slider 41 is coupled mechanically with slider 89 (not shown in Fig. 5) which actuates the forward or reverse operation of relays 1CR and 2CR and contactors FCR and RCR, as shown in Fig. 1.

Another solution for preventing the motor from running in the reverse direction after a regenerative braking period is to provide the system with speed responsive means that are connected to the motor and cause the motor to be deenergized when its speed drops to or near zero, at the end of the regenerative braking period.

A simple way of providing such a speed responsive control, sufficient for many purposes, is to couple a zero-speed switch of conventional construction to the shaft of the motor. This switch may be connected in series with the slider 89 and closes the circuit of contact 89 only when the motor is running at a finite speed in a given direction. As a result, the main contactors are deenergized as soon as the speed of the motor reaches zero so that the speed control handle could be turned all the way in the opposite direction without possibly causing the reversal of the motor running direction.

Figure 6:
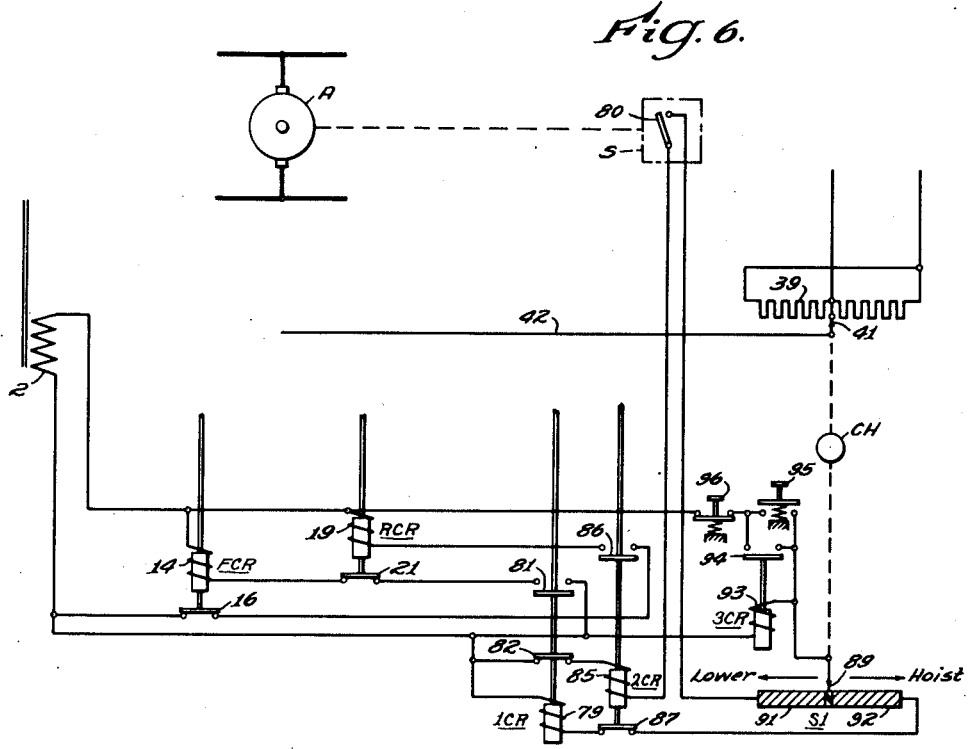

Fig. 6 represents only the modified portion of a system otherwise designed in accordance with Fig. 1. The illustration in Fig. 6 is limited substantially to the circuit elements that are connected with the transformer secondary 2 and shows also a zero-speed switch S connected with the shaft of the motor armature A. Only the lower portions of the contactors FCR, RCR and relays 1CR, 2CR are shown in Fig. 6.

The zero-speed switch S, according to Fig. 6, may consist of a conventional centrifugal switch which closes its normally open contact 80 when the motor is running at a speed above a given minimum near-zero speed. When the control handle CH is moved from the illustrated position toward the right, thus shifting the assembly of slider 41 and contact 89 from the off position to a speed point in the forward or hoisting direction, relay 1CR picks up and causes contactor FCR to pick up. The system then operates in the same manner as described. Contact 80 closes when the motor speed exceeds a given small value. However, when the motor connection is reversed by moving the slider and contact assembly from a forward speed point past the off position to a reverse or lowering braking point, relay 1CR and contactor FCR drop out, while relay 2CR and contactor RCR come in and reverse the motor connection. The motor now operates regeneratively as described in the foregoing. At first the contact 80 remains closed. However, when the motor approaches zero speed, contact 80 opens and the coil circuit of relay 2CR is interrupted so that contactor RCR drops out and deenergizes the motor.

The system illustrated in Fig. 7 is especially designed for operating a reversible motor under push-button or limit switch control at a preset speed which is adjustable within a very wide range and, hence, is especially applicable for machine tool or other fabricating machinery drives that require a rapid and frequent reversing of the motor.

The major portion of the system shown in Fig. 7 is similar to the system according to Fig. 1, and the basic control performance as regards speed adjustment by armature voltage control speed regulation, acceleration, current limitation, and regenerative operation on reversing of the motor are substantially as described in the foregoing with reference to Figs. 1 and 2. Circuit elements and other components of the system shown in Fig. 7 that are similar to components of Fig. 1, are designated by the same respective numerals, so that the foregoing description and explanation for Fig. 1 is in substance directly applicable to Fig. 7 with the exception of the modified features described in the following.

The speed control rheostat in the system of Fig. 7 is denoted by 139, and the appertaining slide contact by 141. It will be noted that this rheostat is connected differently from the corresponding rheostat 39 of Fig. 1 and that, in the system of Fig. 7, this rheostat is not ganged up with a switching device. Instead, the reversing performance of the system shown in Fig. 7 is controlled by push-button or travel limit switches.

A resistor 101 is connected across the motor armature A in order to provide dynamic braking when the motor is to be stopped. The connection of resistor 101 is controlled by the contact 102 of a braking relay BCR whose control coil 103 also actuates a self-holding contact 104. The coil circuit for the brake relay BCR is energized from the transformer secondary 2 under control by additional contacts 105 and 106 in relays 1CR and 2CR respectively. A push-button contact or limit switch 107 serves to initiate the operation of the motor in the forward direction, and a push-button contact or limit switch 108 serves to initiate the operation of the motor in the reverse direction. The contacts 107 and 108 may consist of adjustable limit switches of a machine tool whose selected positions determine the range of travel for a reciprocating machine structure, such as the table of a planer. The arrangement may be such that when, for instance the table reaches the end of travel in the forward direction, the reverse contact 108 is actuated, and that when the reciprocating table reaches the other end of travel, the contact 107 is actuated.

An additional contact 109 in relay 1CR is connected across contact 107, and a contact 110 in relay 2CR is connected across contact 108.

When the contact devices, including the relays and contactors of the system are in the respective position shown in Fig. 7, the motor is deenergized and at rest. The braking resistor 101 is then effective across the motor armature A.

When the forward contact 107 is depressed, coil 79 is energized from transformer winding 2 so that relay 1CR picks up. Relay 1CR seals itself in at contact 109, and stays energized when thereafter the forward contact 107 is released. Contactor FCR picks up because its coil 14 is energized through contact 81 of relay 1CR. At the same time relay BCR is energized through contact 105 of relay 1CR and is sealed in through its contact 104. Thus, the dynamic breaking resistor 101 is disconnected from the armature and stays so until the stop device 96 is actuated. The armature circuit is closed, and motor M accelerates in the forward direction until it reaches a speed determined by the setting of slider 141 in rheostat 139. This speed is regulated to remain constant in accordance with the description presented relative to Fig. 1.

When reverse contact 108 is actuated, coil 79 is deenergized so that relay 1CR and contactor FCR drop out. Relay 2CR picks up because its coil 85 is now energized from transformer winding 2 through contacts 82, 108, 107 and 96. Relay 2CR seals itself in at contact 110 and causes contactor RCR to pick up. The motor, assuming that it has been running forward, is now regeneratively braked and reversed as explained in the foregoing with reference to Figs. 1 and 2. The reverse speed of the motor is also determined by the setting of slider 141 and is the same as the forward running speed, if the setting of slider 141 has not been changed.

It will be recognized that, while in the system of Fig. 1 the reversal of motor connections occurs at a moment when the slider of the speed control rheostat passes through the zero-speed position so that then the thyratron conduction is temporarily reduced to cut-off, the polarity reversal of the motor connection in the system of Fig. 7 occurs without previous displacement of the speed rheostat slider. However, as in the system of Fig. 1, the current-limiting tube 71 and the time circuit of capacitor 76 and resistor 75 become immediately effective to affect the resultant thyratron grid voltage so that the firing point is shifted to make the thyratron conductance zero at the time of reversal of contactors FCR and RCR. Consequently, in both systems the thyratrons are completely cut off during the reversal of contactors FCR and RCR and resume their conduction under fully automatic control of grid voltage provided by the time-delay and current-limit circuits previously described. The current in the motor armature rapidly attains its maximum limit value as set by slider 74 of potentiometer 75, but never exceeds that value.

If it is desired, in systems of the type shown in Fig. 7, to have the motor operate at different speeds in the forward and reverse directions, a second speed potentiometer may be connected in parallel with potentiometer rheostat 139 so that the respective sliders can be set for different speeds in the respective running directions.

In systems according to Fig. 7 the coil 103 of brake relay BCR becomes energized through contact 105 and 106 whenever one of relays 1CR and 2CR picks up. Relay BCR then seals itself in at contact 104 and drops out only when thereafter the stop contact 96 is actuated. Consequently, the resistor 101 remains disconnected from the motor armature A during the entire reversing process in either direction and is effective to dynamically brake the motor only when the motor is to be stopped.

A drive system of this type is particularly well suited for machine tool operations, for example in planers, when many reversals, for example 40 per minute, are required. The main advantage of such a system, as compared with reversing using the dynamic braking lies in its effectiveness and rapidity of reversal since here the reversing torque is maintained even at very low speeds (see Fig. 2), and the motor is forced very effectively through zero speed.

It will be apparent to those skilled in the art after a study of this disclosure that systems according to the invention can be altered and modified in various respects and especially as regards design and circuit connections of the system components without departing from the objects and essence of the invention and within the scope of the essential features of the invention as set forth in the claims annexed hereto.

I claim as my invention:

1. In combination, alternating-current supply means, a controllable rectifier having a control circuit, a direct-current motor connected through said rectifier to said supply means, a single phase-shift circuit of about 120° phase lag connecting said control circuit with said supply means, a source of adjustable direct-current voltage connected with said control circuit for controlling the motor speed, said source having control means for temporarily changing said direct-current voltage from a rectifier firing value to a cut-off value and back to a rectifier firing value, reversing switch means disposed between said motor and said rectifier, and circuit means connecting said control means with said switch means for causing said switch means to reverse the connection of said motor at the time of said cut-off value.

2. A regenerative electronic motor control system, comprising alternating-current supply means, a direct-current motor, a controllable electronic rectifier connecting said motor to said supply means and having a control circuit for varying the firing angle of said rectifier to control the motor speed in accordance with variable control voltage, a phase-shift circuit for about 120° phase lag connected between said supply means and said control circuit for providing an alternating component control voltage, direct-current circuit means connected with said control circuit to provide it with unidirectional component control voltage, said direct-current means comprising a speed-control rheostat for varying said unidirectional component, said rheostat having a movable control contact having a given position for zero speed and being displaceable in both directions from said postion for increasing the speed, reversing contact means disposed between said motor and said rectifier for reversing the polarity of connection of said motor, and a control switch connected with said rheostat contact for controlling said contact means to reverse said motor when said rheostat contact is moved past said given position.

3. A regenerative motor control system, comprising alternating-current supply means, a controllable rectifier having a control circuit, a direct-current motor connected through said rectifier to said supply means, a phase-shift circuit connecting said control circuit with said supply means and having about 120° phase lag for impressing dephased alternating grid voltage on said control circuit, a source of adjustable direct-current voltage connected with said control circuit for controlling the motor speed, said source having control means for temporarily changing said direct-current voltage from a rectifier firing value to a cut-off value and back to a rectifier firing value, reversing switch means disposed between said motor and said rectifier, circuit means connecting said control means with said switch means and being controlled by said control means to cause said switch means to reverse the connection of said motor at the time of said cut-off value, and current-limiting control means responsive to the current flowing through said rectifier and connected with said control means for delaying the change of said direct-current voltage from said cut-off value to said firing value.

4. The method of regeneratively braking a direct-current motor energized from an alternating-current source through a controllable arc discharge tube, which comprises the steps of impressing on the tube during the normal run of the motor a periodic control voltage synchronous with the alternating-current voltage and dephased about 120° varying said control voltage from a tube firing value to a cut-off value and back to a firing value while the motor is running and within an interval of short duration relative to the braking period of the motor, and reversing the polarity of connection of the motor relative to the tube within said interval substantially at the time of said cut-off value.

5. The method of regeneratively braking a direct-current motor energized from an alternating-current source through a controllable arc discharge tube, which comprises the steps of impressing on the tube during the normal run of the motor a periodic control voltage synchronous with the alternating-current voltage and dephased about 120° varying said control voltage from a tube firing value to a cut-off value and back to a firing value while the motor is running and within an interval of short duration relative to the braking period of the motor, reversing the polarity of connection of the motor relative to the tube within said interval substantially at the time of said cut-off value, and thereafter deenergizing the motor in response to occurrence of substantially zero speed.

6. An electronic motor control system for regenerative braking, comprising a direct-current motor, alternating-current supply means, a controllable arc discharge tube connecting said motor with said supply means and having a control circuit, phase shift means of about 120° phase lag connecting said supply means with said control circuit to provide the latter with dephased control voltages, circuit means for varying said control voltage betwen tube firing and tube cut-off conditions, reversing contactor means connected between said motor and said tube for reversing the polarity of motor connection and having a substantially instantaneous reversing operation to provide for regenerative braking when actuated while said motor is running.

7. An electronic motor control system for regenerative braking, comprising a direct-current motor, alternating-current supply means, a controllable arc discharge tube connecting said motor with said supply means to operate as a rectifier during motoring and as an inverter during braking periods, said tube having control-voltage supply means continuously variable from a tube cut-off voltage through a voltage range corresponding to a range of tube firing angles extending above and below 180°, reversing contactor means connected between said motor and said tube for reversing the polarity of motor connection and having a substantially instantaneous reversing operation to provide for regenerative braking when actuated while said motor is running, and control means interconnecting said control voltage supply means and said contactor means for controlling said contactor means to reverse said connection at a moment when the voltage of said control voltage supply means has the cut-off value.

KONSTANTY P. PUCHLOWSKI.

REFERENCES CITED

The following references are of record in the file of this patent:

UNITED STATES PATENTS

| Number | Name | Date |
|---|---|---|
| Re. 20,418 | Howe | June 22, 1937 |
| 452,423 | Blackwell | May 19, 1891 |
| 2,205,214 | Leukert | June 18, 1940 |
| 2,404,641 | Leigh et al. | July 23, 1946 |
| 2,422,567 | Puchlowski | June 17, 1947 |